(12) United States Patent
Jeong et al.

(10) Patent No.: US 11,299,809 B2
(45) Date of Patent: Apr. 12, 2022

(54) ELECTROLYTIC ELECTROLYSIS DEVICE

(71) Applicant: AQENTEC CO., LTD., Incheon (KR)

(72) Inventors: Jin Ho Jeong, Incheon (KR); Hun Arm Kim, Goyang-si (KR)

(73) Assignee: AQENTEC CO., LTD., Incheon (KR)

( * ) Notice: Subject to any disclaimer, the term of this patent is extended or adjusted under 35 U.S.C. 154(b) by 358 days.

(21) Appl. No.: 16/484,760

(22) PCT Filed: Feb. 6, 2018

(86) PCT No.: PCT/KR2018/001557
§ 371 (c)(1),
(2) Date: Aug. 8, 2019

(87) PCT Pub. No.: WO2018/147614
PCT Pub. Date: Aug. 16, 2018

(65) Prior Publication Data
US 2020/0080210 A1    Mar. 12, 2020

(30) Foreign Application Priority Data

Feb. 9, 2017 (KR) .................. 10-2017-0018318
Dec. 8, 2017 (KR) .................. 10-2017-0168470

(51) Int. Cl.
| C25B 9/19 | (2021.01) |
| C25B 13/02 | (2006.01) |
| C25B 15/02 | (2021.01) |
| C25B 15/08 | (2006.01) |
| C25B 9/73 | (2021.01) |
| C25B 11/031 | (2021.01) |

(Continued)

(52) U.S. Cl.
CPC .................. *C25B 9/19* (2021.01); *C25B 1/04* (2013.01); *C25B 9/73* (2021.01); *C25B 11/031* (2021.01); *C25B 13/02* (2013.01); *C25B 13/04* (2013.01); *C25B 15/02* (2013.01); *C25B 15/08* (2013.01)

(58) Field of Classification Search
CPC .... C25B 9/19; C25B 9/21; C25B 9/73; C25B 13/02; C25B 15/08
See application file for complete search history.

(56) References Cited

FOREIGN PATENT DOCUMENTS

| JP | H09-003698 A | 1/1997 |
| JP | 2003-190953 A | 7/2003 |

(Continued)

OTHER PUBLICATIONS

International Search Report and Written Opinion issued for PCT/KR2018/001557, dated Jun. 8, 2018.

(Continued)

*Primary Examiner* — Ciel P Contreras
(74) *Attorney, Agent, or Firm* — Westman Champlin & Koehler, P.A.; Z. Peter Sawicki; Amanda M. Prose (57) ABSTRACT

Disclosed is an electrolytic electrolysis device. According to an embodiment, the electrolytic electrolysis device includes: a tank in which a solvent is supplied through an inlet in a first side thereof, is stored therein, and then is discharged through an outlet in a second side thereof, and an electrolyte is input through an entrance formed in a third side thereof; an electrolysis part formed inside the tank and formed of multiple layers in which a plurality of mesh electrode parts and a plurality of diaphragm parts are alternately formed so that the electrolyte sequentially passes; and a discharge part in which a discharge hole is formed so that an electrolyzed gas in an upper portion of the electrolysis part is discharged.

11 Claims, 4 Drawing Sheets

(51) Int. Cl.
*C25B 13/04* (2021.01)
*C25B 1/04* (2021.01)

(56) References Cited

FOREIGN PATENT DOCUMENTS

| JP | 2012-107280 A | 6/2012 |
|---|---|---|
| KR | 10-0794106 B1 | 1/2008 |
| KR | 10-2016-0040616 A | 4/2016 |
| KR | 10-2016-0119504 A | 10/2016 |
| KR | 10-2016-0144823 A | 12/2016 |

OTHER PUBLICATIONS

Office Action issued for KR 10-2017-0168470, dated Apr. 8, 2019.
Decision to Grant issued for KR 10-2017-0168470, dated Jun. 14, 2019.

ELECTROLYTIC ELECTROLYSIS DEVICE

CROSS-REFERENCE TO RELATED APPLICATION

This Application is a Section 371 National Stage Application of International Application No. PCT/KR2018/001557, filed Feb. 6, 2018, which claims priority of KR 10-2017-0018318 filed with the Korean Intellectual Property Office on Feb. 9, 2017 and KR 10-2017-0168470 filed with the Korean Intellectual Property Office on Dec. 8, 2017, the contents of which are hereby incorporated by reference in their entireties.

TECHNICAL FIELD

The present disclosed relates to an electrolytic electrolysis device and, more particularly, to an electrolytic electrolysis device capable of generating gas by electrolysis of electrolyte and of preventing corrosion of reactor.

BACKGROUND ART

In the following description, unless other indicated, contents described in this section are not the related art with respect to the claims of the application, and it should be understood that the contents in the section are not considered as the related art.

An electrolysis device has been used in various applications. Typically, the device has been used to electrolyze water to generate oxygen and hydrogen to utilize oxygen and hydrogen, respectively, or to combine oxygen and hydrogen again to obtain purified water.

As one application example of the device, electrolyte such as HCl and NaCl is charged into an electrolytic bath provided with anode and cathode electrodes and electrolysis is performed to generate gas that is soluble in water, organic solvent, and inorganic solvent and is discharged from the electrolytic bath to be used for various purposes.

DISCLOSURE

Technical Problem

Accordingly, the present disclosed has been made keeping in mind the above problems occurring in the prior art, and an object of the present invention is to provide electrolytic electrolysis device of an electrolyte, wherein the electrolysis device has a simple electrode array structure, thereby reducing manufacturing cost, improving electrolysis efficiency, and improving a yield of generated hydrogen gas.

Technical Solution

In order to accomplish the above object, the present invention provides an electrolytic electrolysis device including: a tank in which a solvent is supplied through an inlet in a first side thereof and then is discharged through an outlet in a second side thereof after being stored therein, and in which an electrolyte is input through an entrance provided in a third side thereof; an electrolysis part provided inside the tank, and formed of multiple layers in which a plurality of mesh electrode parts and a plurality of diaphragm parts are alternately formed so that the electrolyte sequentially passes through the parts; and a discharge part in which a discharge hole is formed so that electrolyzed gas in an upper portion of the electrolysis part is discharged.

The electrolysis part includes an anode electrode panel and a cathode electrode panel, the anode electrode panel and the cathode electrode panel being spaced apart from each other at a predetermined distance and provided in parallel, and to which anode and cathode electrodes are respectively applied.

Each of the mesh electrode parts includes: an anode mesh electrode having a first end connected to the anode electrode panel of the electrolysis part and horizontally provided; and a cathode mesh electrode having a first end connected to the cathode electrode panel of the electrolysis part and provided in parallel with the anode mesh electrode.

Each of the diaphragm parts includes: a first diaphragm having a first end connected to the anode electrode panel of the electrolysis part and horizontally provided; and a second diaphragm having a first end connected to the cathode electrode panel of the electrolysis part and provided in parallel with the first diaphragm.

The mesh electrode part has a first flow path and a second flow path, the first flow path being provided between a second end of the anode mesh electrode and the cathode electrode panel and the second flow path being provided between a second end of the cathode mesh electrode and the anode electrode panel.

The anode mesh electrode and the cathode mesh electrode have a plurality of through holes so that the electrolyte passes therethrough, and formed of a conductor transmitting electricity.

The diaphragm part has a third flow path and fourth flow path, the third flow path being provided such that a second end of the first diaphragm is spaced apart from the cathode electrode panel and the fourth flow path being provided such that a second end of the second diaphragm is spaced apart from the anode electrode panel.

The discharge part is formed by an upper diaphragm provided in an upward inclining manner toward the discharge hole, and is provided with the solvent flowing along an outside of the discharge hole so as to increase a flow rate of discharged gas, the upper diaphragm constituting an upper portion of the diaphragm parts.

Advantageous Effects

As described above, the electrode array structure of the electrolysis device is simplified, so that the manufacturing cost of the device can be reduced, the electrolysis efficiency can be improved, and the yield of the generated hydrogen gas can be improved.

MODE FOR INVENTION

Hereinafter, exemplary embodiments of the present invention will be described in detail with reference to the accompanying drawings.

The embodiments to be described below are to describe the invention in detail so that the invention can be easily embodied by one of ordinary skill in the art to which this invention belongs. However, this does not mean that the concept and scope of the present invention are not limited thereto.

In addition, the shapes and sizes of components in the drawings may be exaggerated for explicit and convenient description. Further, terms defined in consideration of configuration and function in the present invention may be varied according to the intention of a user, practice, or the like, so that the terms should be defined by the contents of this specification.

Figure 1:
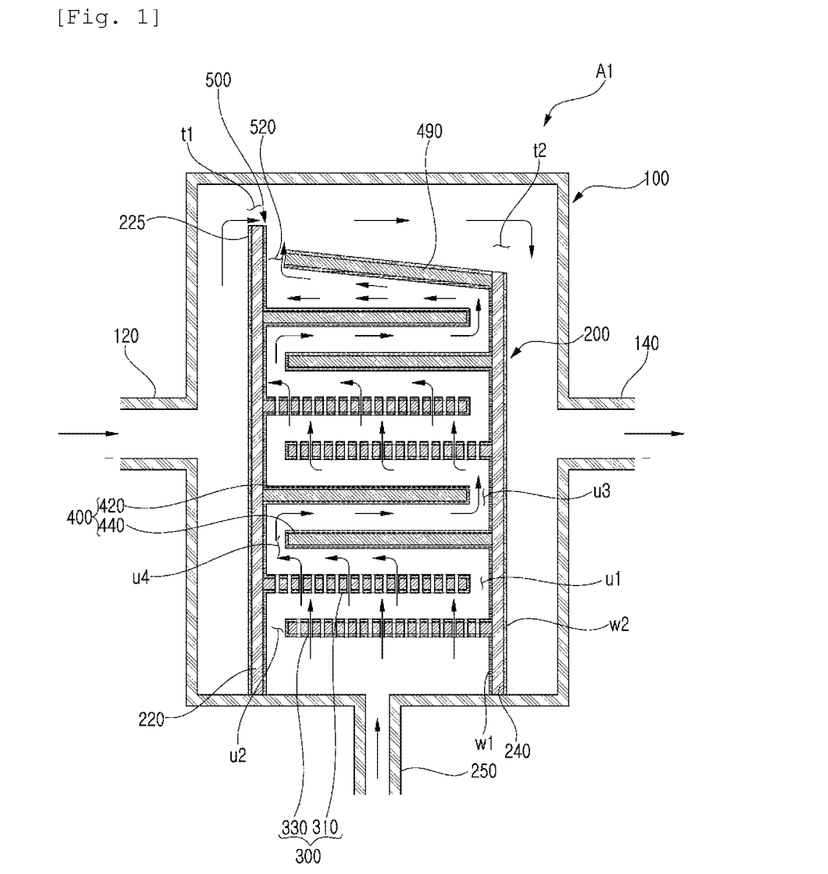
FIG. 1 is a front-sectional view showing an electrolytic electrolysis device according to a first embodiment of the present invention.
Figure 2:
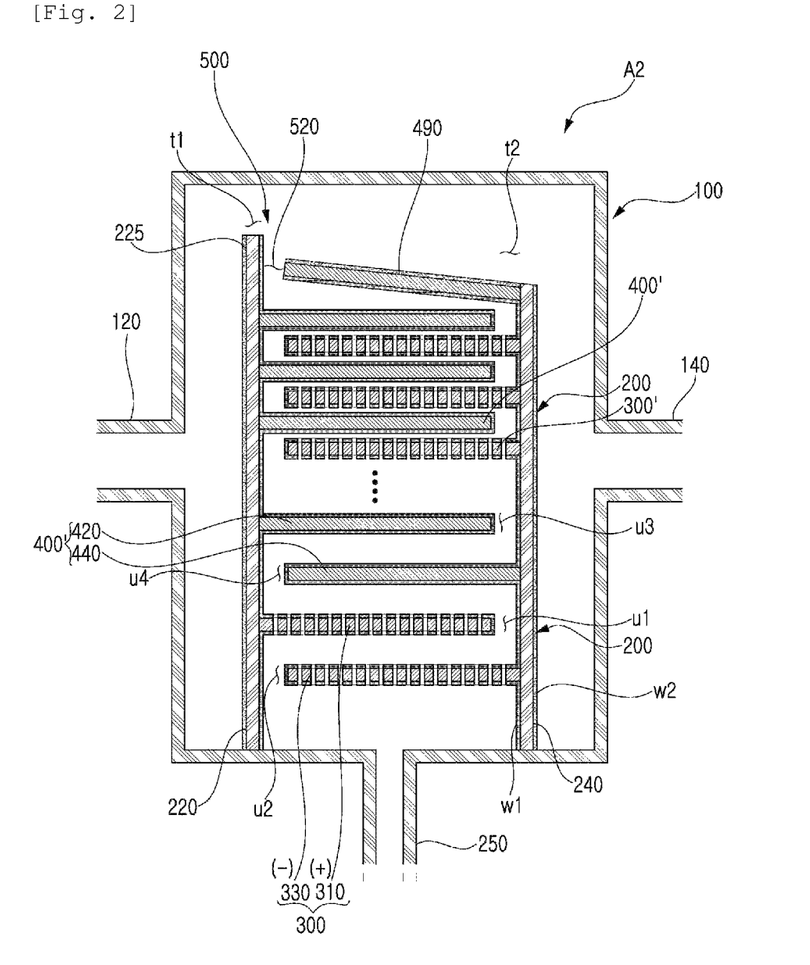
FIG. 2 is a front-sectional view showing the electrolytic electrolysis device according to a second embodiment of the present invention.
Figure 3:
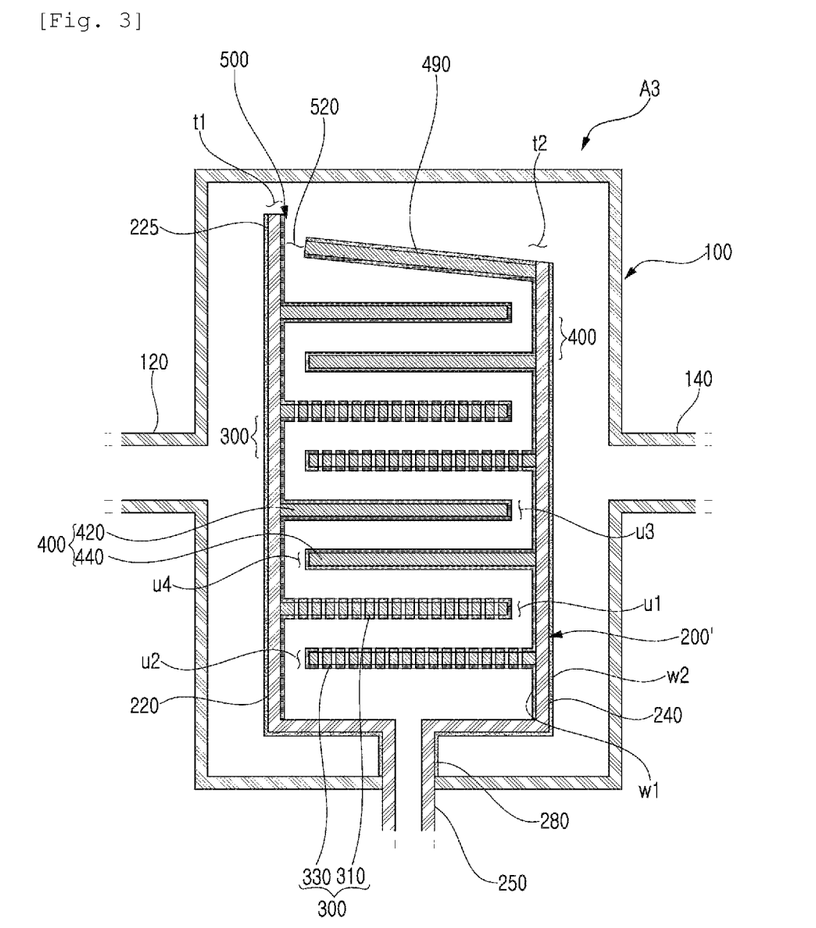
FIG. 3 is a front-sectional view showing the electrolytic electrolysis device according to a third embodiment of the present invention.
Figure 4:
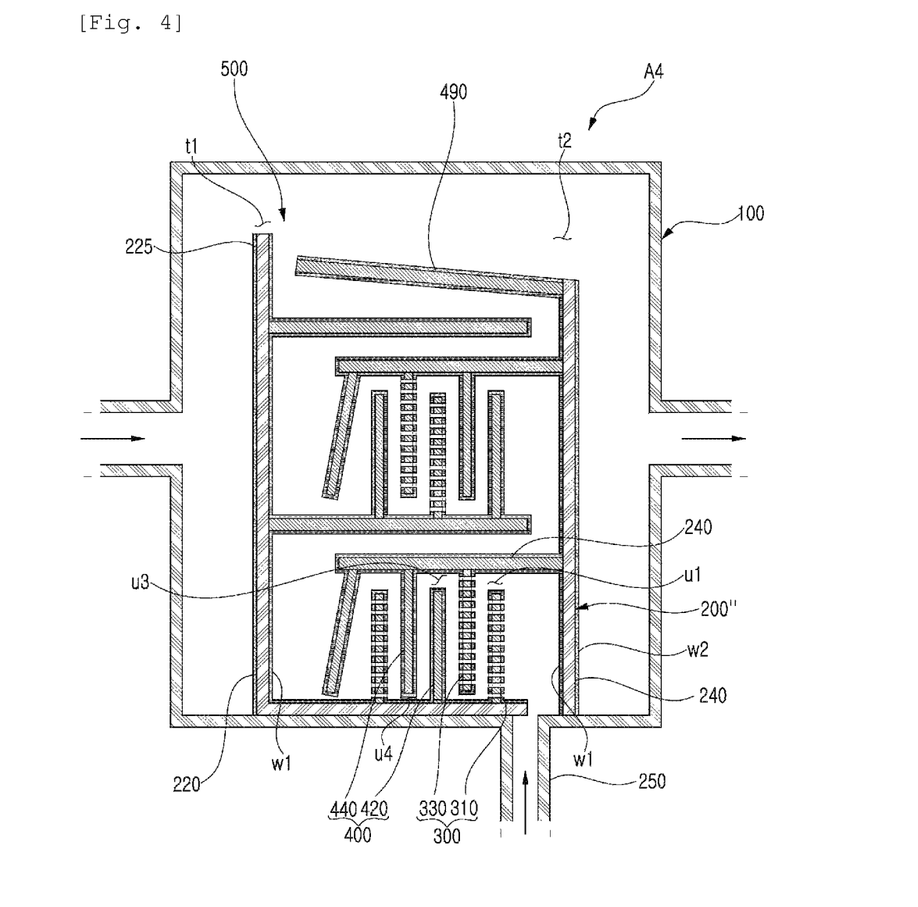
FIG. 4 is a front-sectional view showing the electrolytic electrolysis device according to a fourth embodiment of the present invention.

In the accompanying drawings, FIG. 1 is a front-sectional view showing an electrolytic electrolysis device according to a first embodiment of the present invention. FIG. 2 is a front-sectional view showing the electrolytic electrolysis device according to a second embodiment of the present invention. FIG. 3 is a front-sectional view showing the electrolytic electrolysis device according to a third embodiment of the present invention. FIG. 4 is a front-sectional view showing the electrolytic electrolysis device according to a fourth embodiment of the present invention.

As shown in FIG. 1, the electrolytic electrolysis device includes: a tank 100 in which a solvent is supplied through an inlet 120 in a first side of the tank and then is discharged through an outlet 140 in a second side after being stored therein, and in which an electrolyte enters through an entrance 250 in a third side thereof; an electrolysis part 200 provided inside the tank 100, and formed of multiple layers in which a plurality of mesh electrode parts 300 and a plurality of diaphragm parts 400 are alternately provided so that the electrolyte sequentially passes through the parts; and a discharge part 500 in which a discharge hole 520 is formed so that electrolyzed gas in an upper portion of the electrolysis part 200 is discharged.

The electrolysis part 200 includes an anode electrode panel 220 and a cathode electrode panel 240, the anode electrode panel 220 and the cathode electrode panel 240 being spaced apart from each other at a predetermined distance and being in parallel with each other inside the tank 100 and to which anode and cathode electrodes are respectively applied.

Each of the mesh electrode parts 300 includes an anode mesh electrode 310 and a cathode mesh electrode 330, the anode mesh electrode 310 having a first end connected to the anode electrode panel 220 of the electrolysis part 200 and being horizontally provided and the cathode mesh electrode 330 having a first end connected to the cathode electrode panel 240 of the electrolysis part 200 and provided in parallel with the anode mesh electrode 310.

The mesh electrode part 300 is provided with a first flow path U1 and a second flow path U2, the first flow path U1 being formed between a second end of the anode mesh electrode 310 and the cathode electrode panel 240 and a second flow path U2 being formed between a second end of the cathode mesh electrode 330 and the anode electrode panel 220.

The anode mesh electrode 310 and the cathode mesh electrode 330 are provided with a plurality of through holes so that the electrolyte passes therethrough, and are formed of a conductor transmitting electricity.

The electrolyte is electrolyzed by receiving electricity while passing through the plurality of through holes of the anode mesh electrode 310 and the cathode mesh electrode 330.

An un-electrolyzed electrolyte passes through the first flow path U1 and the second flow path U2, and moves to the plurality of diaphragm parts 400.

Each of diaphragm parts 400 includes a first diaphragm 420 and a second diaphragm 440, the first diaphragm 420 having a first end connected to the anode electrode panel 220 of the electrolysis part 200 and being horizontally formed, the second diaphragm 440 having a first end connected to the cathode electrode panel 240 of the electrolysis part 200 and being formed in parallel with the first diaphragm 420.

A second end of the first diaphragm 420 is spaced apart from the cathode electrode panel 240 to form a third flow path U3.

A second end of the second diaphragm 440 is spaced apart from the anode electrode panel 220 to form a fourth flow path U4.

The un-electrolyzed electrolyte passes through the third flow path U3 and the fourth flow path U4. During the passing of the un-electrolyzed electrolyte, the electrolyte in contact with surfaces of the first diaphragm 420 and the second diaphragm 440 is electrolyzed by receiving electricity.

The electrolyte used in the embodiment is hydrochloric acid (HCl), and the solvent used therein is water ($H_2O$).

A reaction formula is as follows.

The discharge part 500 is formed by an upper diaphragm 490, which constitutes an upper portion of the plurality of diaphragm parts 400 and is formed in an upward inclining manner toward the discharge hole 520.

Referring to FIG. 1, the upper diaphragm 490 is formed in the upward inclining manner to the left.

The discharge hole 520 is formed to have a small diameter and is provided with the solvent flowing along the outside of the discharge hole 520, so that a flow rate of discharged gas is increased.

An upper end 225 of the anode electrode panel 220 is formed by protruding upwards from one end of the upper diaphragm 490, that is, than the discharge hole 520. Thus, a gap between the upper end 225 and an inner wall of the tank 100 is formed narrow and the gap is a first flow path t1, so that the flow rate of the discharged gas is increased when the discharged gas passes through the first flow path t1.

An upper end of the cathode electrode panel 240 is formed at the same height as the upper diaphragm 490 to form a second flow path t2, the second flow path t2 having a wide gap between the inner wall of the tank 100, so that the flow rate is decreased when the discharged gas passes through second flow path t2.

Electrolysis is performed in the plurality of diaphragm parts 400, and gas generated during the electrolysis is resoluble in the solution because the gas is not directly discharged to the outside due to the diaphragm parts 400.

In the plurality of mesh electrode parts 300, HCl is electrolyzed to generate $H_2$ and $Cl_2$.

Meanwhile, by the Bernoulli principle, the gas ($H_2$) discharged through the discharge hole 520 of the discharge part 500 is discharged from the electrolysis part 200 and then is soluble in the water that is the solvent.

That is, the gas may be discharged by a pressure difference between the inside and the outside of the electrolysis part 200 and a flow of the solvent flowing the outside thereof.

The flow rate is increased when the gas passes through the first flow path t1, and a suction force is generated in the discharge hole 520 by the faster flow rate to suck the gas. Thus, the discharge of the gas through the discharge hole 520 may be accelerated.

Films W1 are provided on inner walls of the anode electrode panel 220 and the cathode electrode panel 240, and on surfaces of the anode mesh electrode 310 and the cathode mesh electrode 330.

Each of the films W1 is formed of a material that is capable of transmitting cooling heat (cooling energy) to the electrolysis part 200 and preventing corrosion.

In addition, the film W1 is formed of a conductive-insoluble substance.

As the conductive-insoluble substance, ruthenium (Ru), iridium (Ir), and platinum (Pt) are used.

The anode electrode panel 220 and the cathode electrode panel 240 are formed of titanium (Ti).

Meanwhile, nonconductive oxide films W2 are provided on outer surfaces of the anode electrode panel 220 and the cathode electrode panel 240, and on an outer surface of the upper diaphragm 490 so as to protect the surfaces thereof in contact with the solvent (cold water).

Each of the nonconductive oxide films W2 is selected from the group consisting of titanium oxide ($TiO_2$), Teflon, polypropylene (PP), and polyethylene (PE). The surfaces of the anode electrode panel 220, the cathode electrode panel 240, and the upper diaphragm 490 are coated with the polymeric films using the substances to perform heat transfer, corrosion prevention, and prevention of additional electrical reaction.

Meanwhile, according to a second embodiment A2 of the present invention, the electrolytic electrolysis device includes: the tank 100 in which the solvent is supplied through the inlet 120 in the first side of the tank and then is discharged through the outlet 140 in the second side after being stored therein and in which the electrolyte enters through the entrance 250 in the third side thereof; the electrolysis part 200 provided inside the tank 100, and formed of the multiple layers in which a plurality of mesh electrode parts 300' and a plurality of diaphragm parts 400' are alternately provided so that the electrolyte sequentially passes through the parts; the discharge part 500 in which the discharge hole 520 is formed so that electrolyzed gas in an upper portion of the electrolysis part 200 is discharged.

The electrolysis part 200 includes the anode electrode panel 220 and the cathode electrode panel 240, the anode electrode panel 220 and the cathode electrode panel 240 being spaced apart from each other at the predetermined distance and being in parallel with each other inside the tank 100 and to which anode and cathode electrodes are respectively applied.

Each of the mesh electrode parts 300' includes the anode mesh electrode 310 and the cathode mesh electrode 330, the anode mesh electrode 310 having the first end connected to the anode electrode panel 220 of the electrolysis part 200 and being horizontally provided and the cathode mesh electrode 330 having the first end connected to the cathode electrode panel 240 of the electrolysis part 200 and provided in parallel with the anode mesh electrode 310.

The mesh electrode part 300' is provided with the first flow path U1 and the second flow path U2, the first flow path U1 being formed between the second end of the anode mesh electrode 310 and the cathode electrode panel 240 and the second flow path U2 being formed between the second end of the cathode mesh electrode 330 and the anode electrode panel 220.

The anode mesh electrode 310 and the cathode mesh electrode 330 are provided with the plurality of through holes so that the electrolyte passes therethrough, and are formed of the conductor transmitting electricity.

The electrolyte is electrolyzed by receiving electricity while passing through the plurality of through holes of the anode mesh electrode 310 and the cathode mesh electrode 330.

An un-electrolyzed electrolyte passes through the first flow path U1 and the second flow path U2 and then moves to the plurality of diaphragm parts 400'.

Each of the diaphragm parts 400' includes the first diaphragm 420 and the second diaphragm 440, the first diaphragm 420 having the first end connected to the anode electrode panel 220 of the electrolysis part 200 and being horizontally formed and the second diaphragm 440 having the first end connected to the cathode electrode panel 240 of the electrolysis part 200 and being formed in parallel with the first diaphragm 420.

The second end of the first diaphragm 420 is spaced apart from the cathode electrode panel 240 to form the third flow path U3.

The second end of the second diaphragm 440 is spaced apart from the anode electrode panel 220 to form the fourth flow path U4.

The un-electrolyzed electrolyte passes through the third flow path U3 and the fourth flow path U4. During the passing of the electrolyte, the electrolyte coming into in contact with the surfaces of the first diaphragm 420 and the second diaphragm 440 is electrolyzed by receiving electricity.

The electrolysis part 200 is provided such that the mesh electrode part 300' and the diaphragm part 400' are alternately provided and gaps between the mesh electrode parts 300' and the diaphragm parts 400' are formed to be narrower from the entrance 250 to the discharge hole 520, so that a current density is optimized in accordance with an electrolyte density.

Therefore, in a lower portion of the electrolysis part 200 that has a rich electrolyte density, the electrolyte may pass therethrough quickly and cause a sufficient reaction. However, in an upper portion of the electrolysis part 200 that has a narrow gap, as the electrode density is increased rather than the electrolyte density is reduced by the reaction, a ratio of the gas and the electrolyte in contact with the diaphragm is increased so that electrolysis efficiency may be increased.

In the second embodiment, the electrolyte is hydrochloric acid (HCl), and the solvent is water ($H_2O$).

The reaction formula is as follow.

$$HCl \rightarrow H^+ + Cl^-$$

$$2Cl^- \rightarrow Cl_2 + 2e^-$$

$$2H^+ + 2e^- \rightarrow H_2 \uparrow$$

$$Cl_2 + H_2O \rightarrow HOCl + HCl$$

The discharge part 500 is formed by the upper diaphragm 490, which constitutes an upper portion of the plurality of diaphragm parts 400' and is formed in an upward inclining manner toward the discharge hole 520.

Referring to FIG. 1, the upper diaphragm 490 is formed in the upward inclining manner to the left.

The discharge hole 520 is formed to have the small diameter and is provided with the solvent flowing along the outside of the discharge hole 520, so that the flow rate of discharged gas is increased.

The upper end 225 of the anode electrode panel 220 is formed by protruding upwards from the one end of the upper diaphragm 490, that is, the discharge hole 520. Thus, the gap between the upper end 225 and the inner wall of the tank 100 is formed narrow and the gap is the first flow path t1, so that the flow rate of the discharged gas is increased when the discharged gas passes through the first flow path t1.

The upper end of the cathode electrode panel 240 is formed at the same height as the upper diaphragm 490 to form the second flow path t2, the second flow path t2 having the wide gap between the inner wall of the tank 100, so that the flow rate is reduced when the discharged gas passes through second flow path t2.

Electrolysis is performed in the plurality of diaphragm parts 400', and gas generated during the electrolysis is resoluble in the solution because the gas is not directly discharged to the outside by the diaphragm parts 400.

In the plurality of mesh electrode parts 300', HCl is electrolyzed to generate $H_2$ and $Cl_2$.

Meanwhile, by the Bernoulli principle, the gas ($H_2$) discharged through the discharge hole 520 of the discharge part 500 is discharged from the electrolysis part 200 and then is soluble in the water that is the solvent.

That is, the gas may be discharged by the pressure difference between the inside and the outside of the electrolysis part 200 and the flow of the solvent flowing the outside thereof.

The flow rate is increased when the gas passes through the first flow path t1, and the suction force is generated in the discharge hole 520 by the faster flow rate to suck the gas. Thus, the discharge of the gas through the discharge hole 520 may be accelerated.

The films W1 are provided on the inner walls of the anode electrode panel 220 and the cathode electrode panel 240, and on the surfaces of the anode mesh electrode 310 and the cathode mesh electrode 330.

Each of the films W1 is formed of the material that is capable of transmitting cooling heat to the electrolysis part 200 and preventing corrosion.

In addition, the film W1 is formed of the conductive-insoluble substance.

As the conductive-insoluble substance, ruthenium (Ru), iridium (Ir), and platinum (Pt) are used.

The anode electrode panel 220 and the cathode electrode panel 240 are formed of titanium (Ti).

Meanwhile, the nonconductive oxide films W2 are provided on the outer surfaces of the anode electrode panel 220 and the cathode electrode panel 240, and on the outer surface of the upper diaphragm 490 so as to protect the surfaces thereof in contact with the solvent (cold water).

Each of the nonconductive oxide films W2 is selected from the group consisting of titanium oxide (1102), Teflon, polypropylene (PP), and polyethylene (PE). The surfaces of the anode electrode panel 220, the cathode electrode panel 240, and the upper diaphragm 490 are coated with the polymeric films using the substances to perform heat transfer, corrosion prevention, and prevention of additional electrical reaction.

Meanwhile, according to a third embodiment A3 of the present invention, as shown in FIG. 3, the electrolytic electrolysis device includes: the tank 100 in which the solvent is supplied through the inlet 120 in the first side of the tank and then is discharged through the outlet 140 in the second side after being stored therein, and in which the electrolyte enters through the entrance 250 in the third side thereof; an electrolysis part 200' provided inside the tank 100, and formed of the multiple layers in which the plurality of mesh electrode parts 300 and the plurality of diaphragm parts 400 are alternately provided so that the electrolyte sequentially passes through the parts; and the discharge part 500 in which the discharge hole 520 is formed so that electrolyzed gas in an upper portion of the electrolysis part 200' is discharged.

The electrolysis part 200' is spaced apart from the inside of the tank 100 and be formed in a single body.

The electrolysis part 200' has an inlet tube 280 provided at a lower portion thereof to communicate with the entrance 250. The plurality of mesh electrode parts 300 and the plurality of diaphragm parts 400 are provided in a longitudinal direction of the electrolysis part 200', so that the electrolyte flows from the lower portion of the electrolysis part 200' to the upper portion thereof.

Each of the plurality of mesh electrode parts 300 includes the anode mesh electrode 310 and the cathode mesh electrode 330, the anode mesh electrode 310 having the first end connected to the anode electrode panel 220 of the electrolysis part 200' and being horizontally provided and the cathode mesh electrode 330 having the first end connected to the cathode electrode panel 240 of the electrolysis part 200' and provided in parallel with the anode mesh electrode 310.

The mesh electrode part 300 is provided with the first flow path U1 and the second flow path U2, the first flow path U1 being formed between the second end of the anode mesh electrode 310 and the cathode electrode panel 240 and the second flow path U2 being formed between the second end of the cathode mesh electrode 330 and the anode electrode panel 220.

The anode mesh electrode 310 and the cathode mesh electrode 330 are provided with the plurality of through holes so that the electrolyte passes therethrough, and are formed of the conductor transmitting electricity.

The electrolyte is electrolyzed by receiving electricity while passing through the plurality of through holes of the anode mesh electrode 310 and the cathode mesh electrode 330.

The un-electrolyzed electrolyte passes through the first flow path U1 and the second flow path U2, and moves to the plurality of diaphragm parts 400.

Each of diaphragm parts 400 includes the first diaphragm 420 and the second diaphragm 440, the first diaphragm 420 having the first end connected to the anode electrode panel 220 of the electrolysis part 200' and being horizontally formed, the second diaphragm 440 having the first end connected to the cathode electrode panel 240 of the electrolysis part 200' and being formed in parallel with the first diaphragm 420.

The second end of the first diaphragm 420 is spaced apart from the cathode electrode panel 240 to form the third flow path U3.

The second end of the second diaphragm 440 is spaced apart from the anode electrode panel 220 to form the fourth flow path U4.

The un-electrolyzed electrolyte passes through the third flow path U3 and the fourth flow path U4. During the passing of the un-electrolyzed electrolyte, the electrolyte in contact with surfaces of the first diaphragm 420 and the second diaphragm 440 is electrolyzed by receiving electricity.

The electrolyte used in the embodiment is hydrochloric acid (HCl), and the solvent used therein is water ($H_2O$).

The reaction formula is as follows.

$$HCl \rightarrow H^+ + Cl^-$$

$$2Cl^- \rightarrow Cl_2 + 2e^-$$

$$2H^+ + 2e^- \rightarrow H_2 \uparrow$$

$$Cl_2 + H_2O \rightarrow HOCl + HCl$$

The discharge part 500 is formed by the upper diaphragm 490, the upper diaphragm 490 constituting the upper portion of the plurality of diaphragm parts 400 and being formed in the upward inclining manner toward the discharge hole 520.

Referring to FIG. 3, the upper diaphragm 490 is formed in the inclining manner in an upward direction to the left.

The discharge hole 520 is formed to have the small diameter and is provided with the solvent flowing along the outside of the discharge hole 520, so that the flow rate of discharged gas is increased.

The upper end 225 of the anode electrode panel 220 is formed by protruding upwards from the one end of the upper diaphragm 490, that is, than the discharge hole 520.

Thus, the gap between the upper end 225 and the inner wall of the tank 100 is formed narrow and the gap is the first flow path t1, so that the flow rate of the discharged gas is increased when the discharged gas passes through the first flow path t1.

The upper end of the cathode electrode panel 240 is formed at the same height as the upper diaphragm 490 to form the second flow path t2, the second flow path t2 having the wide gap between the inner wall of the tank 100, so that the flow rate is decreased when the discharged gas passes through second flow path t2.

Electrolysis is performed in the plurality of diaphragm parts 400, and gas generated during the electrolysis is resoluble in the solution because the gas is not directly discharged to the outside by the diaphragm parts 400.

In the plurality of mesh electrode parts 300, HCl is electrolyzed to generate $H_2$ and $Cl_2$.

Meanwhile, by the Bernoulli principle, the gas ($H_2$) discharged through the discharge hole 520 of the discharge part 500 is discharged from the electrolysis part 200' and then is soluble in the water that is the solvent.

That is, the gas may be discharged by the pressure difference between the inside and the outside of the electrolysis part 200' and the flow of the solvent flowing the outside thereof.

The flow rate is increased when the gas passes through the first flow path t1, and the suction force is generated in the discharge hole 520 by the faster flow rate to suck the gas. Thus, the discharge of the gas through the discharge hole 520 may be accelerated.

The films W1 are provided on the inner walls of the anode electrode panel 220 and the cathode electrode panel 240, and on the surfaces of the anode mesh electrode 310 and the cathode mesh electrode 330.

Each of the films W1 is formed of the material that is capable of transmitting the cooling heat to the electrolysis part 200' and preventing corrosion.

In addition, the film W1 is formed of the conductive-insoluble substance.

As the conductive-insoluble substance, ruthenium (Ru), iridium (Ir), and platinum (Pt) are used.

The anode electrode panel 220 and the cathode electrode panel 240 are formed of titanium (Ti).

Meanwhile, the nonconductive oxide films W2 are provided on the outer surfaces of the anode electrode panel 220 and the cathode electrode panel 240, and on the outer surface of the upper diaphragm 490 so as to protect the surfaces thereof in contact with the solvent (cold water).

Each of the nonconductive oxide films W2 is selected from the group consisting of titanium oxide ($TiO_2$), Teflon, polypropylene (PP), and polyethylene (PE). The surfaces of the anode electrode panel 220, the cathode electrode panel 240, and the upper diaphragm 490 are coated with the polymeric films using the substances to perform heat transfer, corrosion prevention, and prevention of additional electrical reaction.

Meanwhile, according to a fourth embodiment A4 of the present invention, as shown in FIG. 4, the electrolytic electrolysis device includes: the tank 100 in which the solvent is supplied through the inlet 120 in the first side of the tank and then is discharged through the outlet 140 in the second side after being stored therein, and in which the electrolyte enters through the entrance 250 in the third side thereof; an electrolysis part 200" provided inside the tank 100, and formed of the multiple layers in which the plurality of mesh electrode parts 300 and the plurality of diaphragm parts 400 are alternately provided so that the electrolyte sequentially passes through the parts; the discharge part 500 in which the discharge hole 520 is formed so that electrolyzed gas in an upper portion of the electrolysis part 200" is discharged.

The electrolysis part 200" is provided inside of the tank 100, and the plurality of mesh electrode parts 300 and the plurality of diaphragm parts 400 are vertically provided and disposed in a transverse direction so that the electrolyte transversely flows.

Each of the mesh electrode parts 300 includes the anode mesh electrode 310 and the cathode mesh electrode 330, the anode mesh electrode 310 having the first end connected to the anode electrode panel 220 of the electrolysis part 200" and being vertically provided and the cathode mesh electrode 330 having the first end connected to the cathode electrode panel 240 of the electrolysis part 200" and provided in parallel with the anode mesh electrode 310.

The mesh electrode part 300 is provided with the first flow path U1 and the second flow path U2, the first flow path U1 being formed between the second end of the anode mesh electrode 310 and the cathode electrode panel 240 and the second flow path U2 being formed between the second end of the cathode mesh electrode 330 and the anode electrode panel 220.

The anode mesh electrode 310 and the cathode mesh electrode 330 are provided with the plurality of through holes so that the electrolyte passes therethrough, and are formed of the conductor transmitting electricity.

The electrolyte is electrolyzed by receiving electricity while passing through the plurality of through holes of the anode mesh electrode 310 and the cathode mesh electrode 330.

The un-electrolyzed electrolyte passes through the first flow path U1 and the second flow path U2, and moves to the plurality of diaphragm parts 400.

Each of diaphragm parts 400 includes the first diaphragm 420 and the second diaphragm 440, the first diaphragm 420 having the first end connected to the anode electrode panel 220 of the electrolysis part 200" and being horizontally formed, the second diaphragm 440 having the first end connected to the cathode electrode panel 240 of the electrolysis part 200" and being formed in parallel with the first diaphragm 420.

The second end of the first diaphragm 420 is spaced apart from the cathode electrode panel 240 to form a third flow path U3.

The second end of the second diaphragm 440 is spaced apart from the anode electrode panel 220 to form a fourth flow path U4.

The un-electrolyzed electrolyte passes through the third flow path U3 and the fourth flow path U4. During the passing of the un-electrolyzed electrolyte, the electrolyte in contact with surfaces of the first diaphragm 420 and the second diaphragm 440 is electrolyzed by receiving electricity.

The electrolyte used in the embodiment is hydrochloric acid (HCl), and the solvent used therein is water ($H_2O$).

The reaction formula is as follows.

$$HCl \rightarrow H^+ + Cl^-$$

$$2Cl^- \rightarrow Cl_2 + 2e^-$$

$$2H^+ + 2e^- \rightarrow H_2 \uparrow$$

$$Cl_2 + H_2O \rightarrow HOCl + HCl$$

The discharge part 500 is formed by the upper diaphragm 490, the upper diaphragm 490 constituting the upper portion of the plurality of diaphragm parts 400 and being formed in the upward inclining manner toward the discharge hole 520.

Referring to FIG. 4, the upper diaphragm 490 is formed in the upward inclining manner to the left.

The discharge hole 520 is formed to have the small diameter and is provided with the solvent flowing along the outside of the discharge hole 520, so that the flow rate of discharged gas is increased.

The upper end 225 of the anode electrode panel 220 is formed by protruding upwards from the one end of the upper diaphragm 490, that is, than the discharge hole 520. Thus, the gap between the upper end 225 and the inner wall of the tank 100 is formed narrow and the gap is the first flow path t1, so that the flow rate of the discharged gas is increased when the discharged gas passes through the first flow path t1.

The upper end of the cathode electrode panel 240 is formed at the same height as the upper diaphragm 490 to form the second flow path t2, the second flow path t2 having a wide gap between the inner wall of the tank 100, so that the flow rate is decreased when the discharged gas passes through second flow path t2.

Electrolysis is performed in the plurality of diaphragm parts 400, and gas generated during the electrolysis is resoluble in the solution because the gas is not directly discharged to the outside by the diaphragm parts 400.

In the plurality of mesh electrode parts 300, HCl is electrolyzed to generate $H_2$ and $Cl_2$.

Meanwhile, by the Bernoulli principle, the gas ($H_2$) discharged through the discharge hole 520 of the discharge part 500 is discharged from the electrolysis part 200″ and then is soluble in the water that is the solvent.

That is, the gas may be discharged by the pressure difference between the inside and the outside of the electrolysis part 200″ and the flow of the solvent flowing the outside thereof.

The flow rate is increased when the gas passes through the first flow path t1, and the suction force is generated in the discharge hole 520 by the faster flow rate to suck the gas. Thus, the discharge of the gas through the discharge hole 520 may be accelerated.

The films W1 are provided on the inner walls of the anode electrode panel 220 and the cathode electrode panel 240, and on the surfaces of the anode mesh electrode 310 and the cathode mesh electrode 330.

Each of The films W1 is formed of the material that is capable of transmitting cooling heat to the electrolysis part 200″ and preventing corrosion.

In addition, the film W1 is formed of the conductive-insoluble substance.

As the conductive-insoluble substance, ruthenium (Ru), iridium (Ir), and platinum (Pt) are used.

The anode electrode panel 220 and the cathode electrode panel 240 are formed of titanium (Ti).

Meanwhile, the nonconductive oxide films W2 are provided on the outer surfaces of the anode electrode panel 220 and the cathode electrode panel 240, and on the outer surface of the upper diaphragm 490 so as to protect the surfaces thereof in contact with the solvent (cold water).

Each of the nonconductive oxide films W2 is selected from the group consisting of titanium oxide ($TiO_2$), Teflon, polypropylene (PP), and polyethylene (PE). The surfaces of the anode electrode panel 220, the cathode electrode panel 240, and the upper diaphragm 490 are coated with the polymeric films using the substances to perform heat transfer, corrosion prevention, and prevention of additional electrical reaction.

Although preferred embodiments of the present invention have been described for illustrative purposes, those skilled in the art will appreciate that various modifications, additions are possible, without departing from the scope and spirit of the invention as disclosed in the accompanying claims, and it should be understood that the various modifications, additions are included within the scope of the accompanying claims.

| [Description of reference numerals] | |
|---|---|
| 100: tank | 200: electrolysis part |
| 300: mesh electrode part | |
| 220: anode electrode panel | |
| 240: cathode electrode panel | |
| 310: anode mesh electrode | |
| 330: cathode mesh electrode | |
| 400: diaphragm part | |
| 420: first diaphragm | 440: second diaphragm |
| 500: discharge part | |

The invention claimed is:

1. An electrolytic electrolysis device comprising:
a tank in which a solvent is supplied through an inlet in a first side thereof and then is discharged through an outlet in a second side thereof after being stored therein, and in which an electrolyte is input through an entrance provided in a third side thereof;
an electrolysis part provided inside the tank, and formed of multiple layers in which a plurality of mesh electrode parts and a plurality of diaphragm parts are alternately formed so that the electrolyte sequentially passes through the mesh electrode parts; and
a discharge part in which a discharge hole is formed so that electrolyzed gas in an upper portion of the electrolysis part is discharged,
wherein the discharge part is formed by an upper diaphragm provided in an upward inclining manner toward the discharge hole, and is provided with the solvent flowing along an outside of the discharge hole so as to increase a flow rate of discharged gas, the upper diaphragm constituting an upper portion of the diaphragm parts,
wherein the mesh electrode parts and the diaphragm parts are provided such that intervals therebetween are formed to be narrower gradually from the entrance to the discharge hole.

2. The electrolytic electrolysis device of claim 1, wherein the electrolysis part comprises: an anode electrode panel and a cathode electrode panel, the anode electrode panel and the cathode electrode panel being spaced apart from each other at a predetermined distance and provided in parallel, and to which anode and cathode electrodes of the mesh electrode parts are respectively applied.

3. The electrolytic electrolysis device of claim 2, wherein each of the diaphragm parts comprises;
a first diaphragm having a first end connected to the anode electrode panel of the electrolysis part and horizontally provided; and
a second diaphragm having a first end connected to the cathode electrode panel of the electrolysis part and provided in parallel with the first diaphragm.

4. The electrolytic electrolysis device of claim 3, further comprising:
a third flow path provided such that a second end of the first diaphragm is spaced apart from the cathode electrode panel; and
a fourth flow path provided such that a second end of the second diaphragm is spaced apart from the anode electrode panel.

5. The electrolytic electrolysis device of claim 1, wherein each of the mesh electrode parts comprises:
an anode mesh electrode having a first end connected to an anode electrode panel of the electrolysis part and horizontally provided; and
a cathode mesh electrode having a first end connected to a cathode electrode panel of the electrolysis part and provided in parallel with the anode mesh electrode.

6. The electrolytic electrolysis device of claim 5, wherein each of the mesh electrode part has a first flow path and a second flow path, the first flow path being provided between a second end of the anode mesh electrode and the cathode electrode panel and the second flow path being provided between a second end of the cathode mesh electrode and the anode electrode panel.

7. The electrolytic electrolysis device of claim 5, wherein each of the anode mesh electrode and the cathode mesh electrode have a plurality of through holes so that the electrolyte passes therethrough, and formed of a conductor transmitting electricity.

8. The electrolytic electrolysis device of claim 5, wherein films are provided on inner surfaces of the anode electrode panel and the cathode electrode panel and on surfaces of each of the anode mesh electrode and cathode mesh electrode, each film being formed of a conductive-insoluble substance.

9. The electrolytic electrolysis device of claim 8, wherein the conductive-insoluble substance is selected from a group consisting of ruthenium, iridium, and platinum.

10. The electrolytic electrolysis device of claim 1, wherein the electrolysis part is formed in a shape of a single body while being spaced apart from the inside of the tank, and in which an inlet tube is provided at a lower portion of the electrolysis part and communicates with the entrance and in which the mesh electrode parts and the diaphragm parts are arranged in a longitudinal direction of the electrolysis part so that the electrolyte flows from the lower portion of the electrolysis part to an upper portion thereof.

11. The electrolytic electrolysis device of claim 1, wherein the electrolysis part is provided inside the tank, and in which the mesh electrode parts and the diaphragm parts are arranged in a transverse direction so that the electrolyte transversely flows.

\* \* \* \* \*